US012578591B2

(12) United States Patent
Fu et al.

(10) Patent No.: US 12,578,591 B2
(45) Date of Patent: Mar. 17, 2026

(54) WEARABLE DEVICES AND QUICK-RELEASE ASSEMBLIES THEREOF

(71) Applicant: SHENZHEN SHOKZ CO., LTD., Shenzhen (CN)

(72) Inventors: Xin Fu, Shenzhen (CN); Zhiqing Liu, Shenzhen (CN); Yueqiang Wang, Shenzhen (CN); Haofeng Zhang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 350 days.

(21) Appl. No.: 18/322,576

(22) Filed: May 23, 2023

(65) Prior Publication Data

US 2023/0296915 A1 Sep. 21, 2023

Related U.S. Application Data

(63) Continuation of application No. PCT/CN2022/093622, filed on May 18, 2022.

(30) Foreign Application Priority Data

| | | |
|---|---|---|
| May 19, 2021 | (CN) | 202110545559.2 |
| May 19, 2021 | (CN) | 202121079519.5 |
| Jan. 27, 2022 | (CN) | 202220235659.5 |

(51) Int. Cl.
G02C 5/14 (2006.01)
G02C 5/22 (2006.01)

(52) U.S. Cl.
CPC ............... G02C 5/146 (2013.01); G02C 5/22 (2013.01)

(58) Field of Classification Search
CPC ...... G02C 5/146; G02C 2200/06; G02C 1/10; G02C 2200/08
See application file for complete search history.

(56) References Cited

U.S. PATENT DOCUMENTS

| | | |
|---|---|---|
| 10,012,847 B1 | 7/2018 | Huang |
| 2005/0206837 A1 | 9/2005 | Toulch |

(Continued)

FOREIGN PATENT DOCUMENTS

| | | | | |
|---|---|---|---|---|
| CN | 104049376 A | 9/2014 | | |
| CN | 104678570 A | * 6/2015 | ........... | G02C 5/2254 |

(Continued)

OTHER PUBLICATIONS

Machine translation of JP 2000275583 retrieved electronically from PE2E Search Aug. 28, 2025 (Year: 2000).*

(Continued)

*Primary Examiner* — Cara E Rakowski
(74) *Attorney, Agent, or Firm* — METIS IP LLC

(57) ABSTRACT

A quick-release assembly of a wearable device is disclosed and includes a locking member and a mounting base provided with an insertion cavity having an opening formed on a side of the mounting base. An accommodation cavity is provided in the mounting base and spatially connected to the insertion cavity. The locking member includes a locking portion movably disposed on the mounting base along a direction connecting the accommodation cavity and the insertion cavity and an unlocking portion connected to the locking portion. The locking member has a first state and a second state relative to the mounting base. In the first state, at least a portion of the locking portion is disposed within the insertion cavity to lock a visual member entering the insertion cavity through the opening. In the second state, the locking portion is accommodated within the accommodation cavity to release the lock of the visual member.

15 Claims, 10 Drawing Sheets

(56) References Cited

U.S. PATENT DOCUMENTS

| | | | |
|---|---|---|---|
| 2011/0085751 A1 | 4/2011 | Lin et al. |
| 2011/0197400 A1 | 8/2011 | Chevrolet |
| 2013/0077041 A1 | 3/2013 | Chih |
| 2016/0054585 A1 | 2/2016 | Alcini |
| 2019/0137783 A1 | 5/2019 | Huang |
| 2020/0405017 A1 | 12/2020 | Hu et al. |
| 2021/0015220 A1 | 1/2021 | Xue et al. |
| 2021/0072559 A1 | 3/2021 | Wang et al. |

FOREIGN PATENT DOCUMENTS

| | | | | | |
|---|---|---|---|---|---|
| CN | 209674123 U | | 11/2019 | | |
| CN | 215642098 U | | 1/2022 | | |
| DE | 202014010238 U1 | | 4/2015 | | |
| EP | 3754417 A1 | | 12/2020 | | |
| FR | 2906900 A1 | | 4/2008 | | |
| JP | 2000275583 A | * | 10/2000 | | |
| JP | 2005308915 A | * | 11/2005 | | |
| JP | 2010262121 A | * | 11/2010 | | |
| JP | 2013242421 A | * | 12/2013 | | |
| JP | 2019518342 A | * | 6/2019 | .............. | G06F 3/011 |
| JP | 2020173329 A | * | 10/2020 | | |
| WO | 2021012809 A1 | | 1/2021 | | |

OTHER PUBLICATIONS

Machine translation of JP 2005308915 retrieved electronically from PE2E Search Aug. 28, 2025 (Year: 2005).*

Machine translation of JP 2010262121 retrieved electronically from PE2E Search Aug. 28, 2025 (Year: 2010).*

Machine translation of JP 2013242421 retrieved electronically from PE2E Search Aug. 28, 2025 (Year: 2013).*

Machine translation of CN 104678570 retrieved electronically from PE2E Search Aug. 28, 2025 (Year: 2015).*

Machine translation of JP 2019518342 retrieved electronically from PE2E Search Aug. 28, 2025 (Year: 2019).*

Machine translation of JP 2020173329 retrieved electronically from PE2E Search Aug. 28, 2025 (Year: 2020).*

International Search Report in PCT/CN2022/093622 mailed on Aug. 10, 2022, 6 pages.

First Office Action in Chinese Application No. 202110545559.2 mailed on Apr. 3, 2024, 13 pages.

Notice of Reasons for Rejection in Japanese Application No. 2023-539887 mailed on May 7, 2024, 19 pages.

The Extended European Search Report in European Application No. 22804010.1 mailed on Aug. 20, 2024, 9 pages.

* cited by examiner

WEARABLE DEVICES AND QUICK-RELEASE ASSEMBLIES THEREOF

CROSS-REFERENCE TO RELATED APPLICATIONS

This application is a Continuation of International Application No. PCT/CN2022/093622, filed on May 18, 2022, which claims priority of Chinese Patent Application No. 202110545559.2, filed on May 19, 2021, entitled "A WEARABLE DEVICE," Chinese Patent Application No. 202121079519.5, filed on May 19, 2021, entitled "A WEARABLE DEVICE," and Chinese Patent Application No. 202220235659.5, filed on Jan. 27, 2022, entitled "WEARABLE DEVICES AND QUICK-RELEASE ASSEMBLIES THEREOF," the entire contents of each of which are incorporated herein by reference.

TECHNICAL FIELD

The present disclosure relates to the field of wearable devices, and in particular, to a wearable device and a quick-release assembly thereof.

BACKGROUND

Today there are various devices on the market such as functional glasses and smart glasses. The functional glasses may correct users' vision, and the smart glasses may not only correct users' vision, but also provide visual and/or auditory functions.

In glasses devices, the connection structure between the lens and temples is mostly difficult to disassemble. Especially in smart glasses, the lens and/or temples are equipped with a variety of functional assemblies. Once a part of the lens and/or temples fails, it will cost a lot to replace the lens and/or temples, and the replacement of the faulty components is difficult to disassemble and assemble, and it is difficult for ordinary consumers to replace by themselves.

SUMMARY

The present disclosure mainly provides a wearable device and a quick-release assembly thereof to solve the problem of difficult and slow disassembly and assembly between components of the wearable device.

In order to solve the above technical problems, one of the technical solutions in the present disclosure is to provide a quick-release assembly. The quick-release assembly is applied to a wearable device. The quick-release assembly includes a mounting base and a locking member. The mounting base is provided with an insertion cavity. The insertion cavity has an opening formed on a side of the mounting base. An accommodation cavity is provided in the mounting base and spatially connected to the insertion cavity. The locking member includes a locking portion and an unlocking portion connected to the locking portion. The locking member is movably disposed on the mounting base along a direction connecting the accommodation cavity and the insertion cavity. The locking member has a first state and a second state relative to the mounting base. In the first state, at least a portion of the locking portion is disposed within the insertion cavity to lock a visual member that enters the insertion cavity through the opening. In the second state, the locking portion is accommodated within the accommodation cavity to release the lock of the visual member.

In some embodiments, the locking member is switched between the first state and the second state by pressing or rotating.

In some embodiments, the locking member is slidably arranged on the mounting base. The quick-release assembly further includes an elastic member arranged on the mounting base. The locking member is switched from the first state to the second state by pressing the locking member, the locking member compresses the elastic member, and the elastic member provides an elastic force to drive the locking member to switch from the second state to the first state.

In some embodiments, the mounting base is further provided with a guide cavity that is on a side of the mounting base away from the accommodation cavity and spatially connected to the insertion cavity. The quick-release assembly further includes a push member. The push member is connected to an end of the locking member away from the accommodation cavity and slidably arranged in the guide cavity so that the push member is allowed to be pressed to cause the locking member to switch from the second state to the first state.

In some embodiments, the elastic member is elastically compressed and supported between a bottom wall of the guide cavity and the push member.

In some embodiments, the locking member is mounted on the mounting base by the guide cavity. The quick-release assembly further includes a gasket. The gasket is supported by the bottom wall of the guide cavity. The gasket partially covers a connection port between the guide cavity and the insertion cavity to at least partially cover the locking portion. One end of the elastic member is supported on the gasket.

In some embodiments, the locking portion is further provided with a guide surface facing the opening, so that when the visual member is mounted on the insertion cavity, the visual member presses the locking member through the guide surface to cause the locking member to switch from the first state to the second state. The guide surface is out of contact with the visual member to cause the elastic member to drive the locking member to switch from the second state to the first state.

In some embodiments, the elastic member is compressed and arranged on a bottom wall of the accommodation cavity and an end of the locking portion away from the unlocking portion.

In some embodiments, the locking portion and the unlocking portion are arranged in a stepped manner. A cross-sectional size of the unlocking portion in the direction connecting the accommodation cavity and the insertion cavity is smaller than a cross-sectional size of the locking portion.

In some embodiments, one end of the elastic member is fixed to the bottom wall of the accommodation cavity, and the other end of the elastic member is provided with an embedding hole. An end of the locking portion facing the elastic member is provided with an embedding portion, and the embedding portion is mounted on the embedding hole.

In some embodiments, the elastic member is a silicone member. The elastic member includes a cylindrical portion and a support flange. The support flange is arranged on one end of the cylindrical portion toward the locking member and extends along a radial direction of the cylindrical portion toward a central axis of the cylindrical portion. The locking portion is supported by the support flange, and the embedding hole is arranged on the support flange.

In some embodiments, the quick-release assembly further includes a positioning cover. The positioning cover is arranged on the mounting base to form the accommodation cavity. The positioning cover includes a cylinder body, a cylinder body bottom wall arranged on one end of the cylinder body, and a blocking ring arranged on the other end of the cylinder body. One end of the locking portion away from the unlocking portion is provided with a buckle. The elastic member is arranged between the cylinder body bottom wall and the locking portion. The locking portion is slidable relative to the cylinder body. The buckle cooperates with the blocking ring to restrict the locking member from detaching from the positioning cover.

In some embodiments, the locking portion cooperates with a side wall of the accommodation cavity. The locking member is further provided with a first guide portion, and the mounting base is provided with a second guide portion cooperating with the first guide portion.

In some embodiments, the first guide portion is a guide hole, and the second guide portion is a guide rod arranged on a bottom wall of the accommodation cavity.

In some embodiments, the first guide portion is a guide block arranged on one side of the locking member, and the second guide portion is a guide slot arranged on the mounting base.

In some embodiments, a blocking wall is provided between the guide slot, the insertion cavity, and the accommodation cavity. The blocking wall is provided with a connection port connecting the guide slot, the insertion cavity, and the accommodation cavity. The blocking wall is used to block the guide block.

In some embodiments, the guide block includes a guide portion and an elastic portion. One end of the elastic portion is connected to the guide portion and forms an elastic gap with the guide portion. The elastic portion presses against a side wall of the guide slot.

In some embodiments, one side of the mounting base is further provided with a positioning slot. The positioning slot is used to guide the visual member to insert into the opening of the insertion cavity and cooperate with the insertion cavity to position the visual member.

In some embodiments, one end of the mounting base away from the opening of the insertion cavity is further provided with a rotating connection portion. The rotating connection portion is used to hinge a wearing member of the wearable device.

In order to solve the above technical problems, another technical solution in the present disclosure is to provide a wearable device. The wearable device includes a visual member and the quick-release assembly as described above. The visual member is inserted into the insertion cavity and locked with the locking member.

The beneficial effects of the present disclosure are as follows. Different from the prior art, the present disclosure discloses a wearable device and a quick-release assembly thereof. The insertion cavity is provided on the mounting base, the locking member is disposed on the mounting base and passes through the insertion cavity, and the position of the locking member is adjustable, so that the locking portion or the unlocking portion can be adjusted to fit with the locking hole on the visual member by switching the first state and the second state of the locking member, so as to lock the visual member inserted in the insertion cavity or unlock the visual member, thereby improving the efficiency of disassembly and assembly between the visual member and the mounting base, and thus, the efficiency of the disassembly and assembly of the visual member and the quick-release assembly is very efficient and convenient.

BRIEF DESCRIPTION OF THE DRAWINGS

In order to more clearly illustrate the technical solutions in the embodiments of the present disclosure, the following would briefly introduce the drawings that need to be used in the description of the embodiments. Obviously, the drawings in the following description are only some embodiments of the present disclosure, and those skilled in the art can obtain other drawings based on these drawings without any creative work, and wherein.

DETAILED DESCRIPTION

The technical solutions in the embodiments of the present disclosure are clearly and completely described below in conjunction with the drawings in the embodiments of the present disclosure. It is clear that the described embodiments are only some of the embodiments of the present disclosure, and not all of them. All other embodiments obtained by those skilled in the art based on the embodiments in the present disclosure without creative labor fall within the scope of protection of the present disclosure.

The terms "first," "second," and "third" in the embodiments of the present disclosure are used for descriptive purposes only, and are not to be understood as indicating or implying relative importance or implicitly or specifying the quantity of indicated technical features. Thus, features qualified with "first," "second," or "third" may explicitly or implicitly include at least one of these features. In the description of the present disclosure, "plurality" means at least two, e.g., two, three, etc., unless otherwise specifically defined. Furthermore, the terms "include" and "have," and any variations thereof, are intended to cover a non-exclusive inclusion. For example, a process, method, system, product, or apparatus comprising a series of steps or units is not limited to the listed steps or units, but optionally also includes unlisted steps or units, or optionally further includes other steps or units inherent to those processes, methods, products, or apparatus.

References herein to "embodiment" mean that a particular feature, structure, or characteristic described in conjunction with the embodiment may be included in at least one embodiment of the present disclosure. The appearances of the phrase in various places in the present disclosure are not necessarily all referring to the same embodiment, nor are separate or alternative embodiments mutually exclusive of other embodiments. It can be understood explicitly and implicitly by those skilled in the art that the embodiments described herein can be combined with other embodiments.

Figure 1:
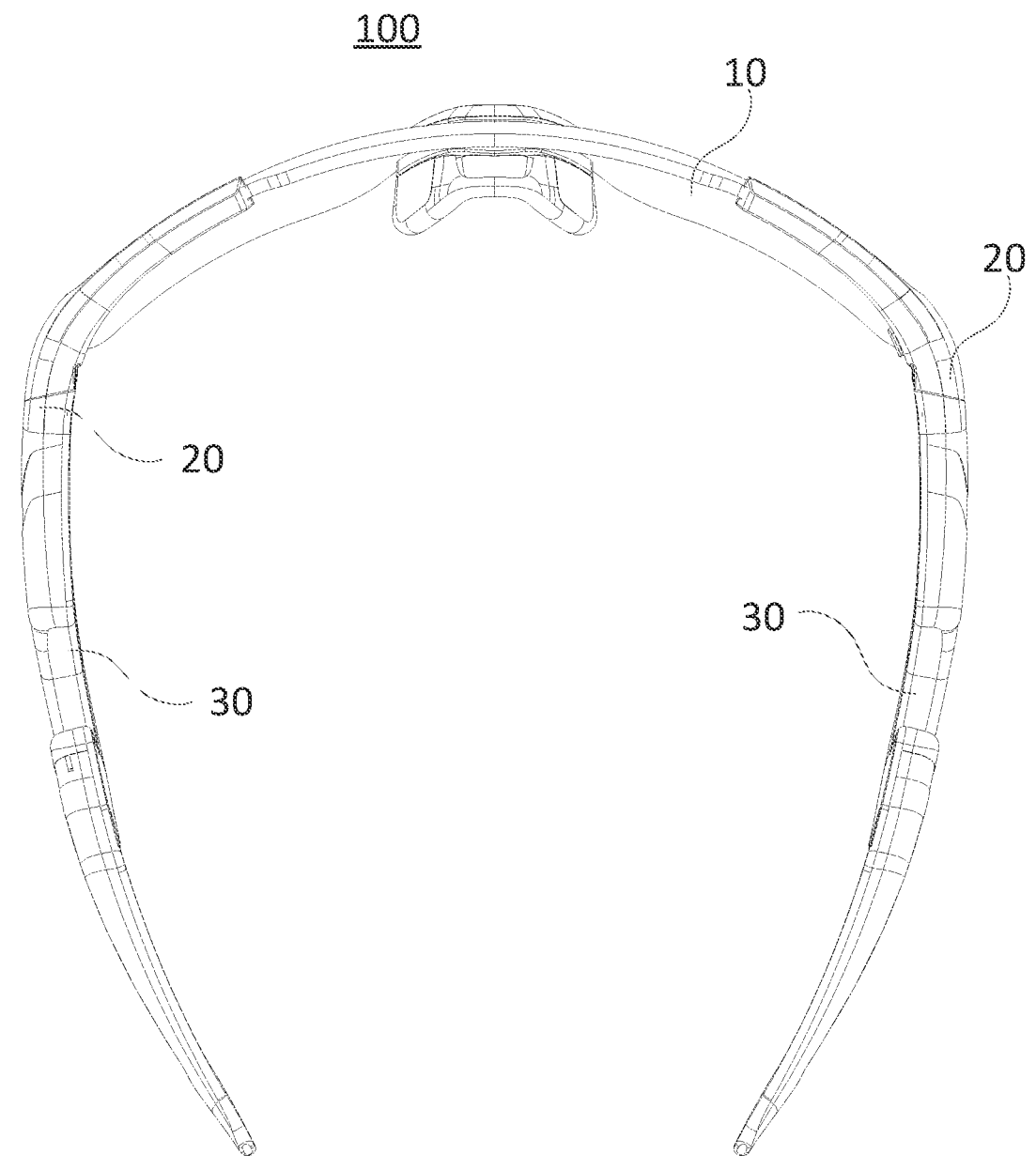
FIG. 1 is a schematic diagram illustrating a structure of a wearable device according to an embodiment of the present disclosure.
Figure 2:
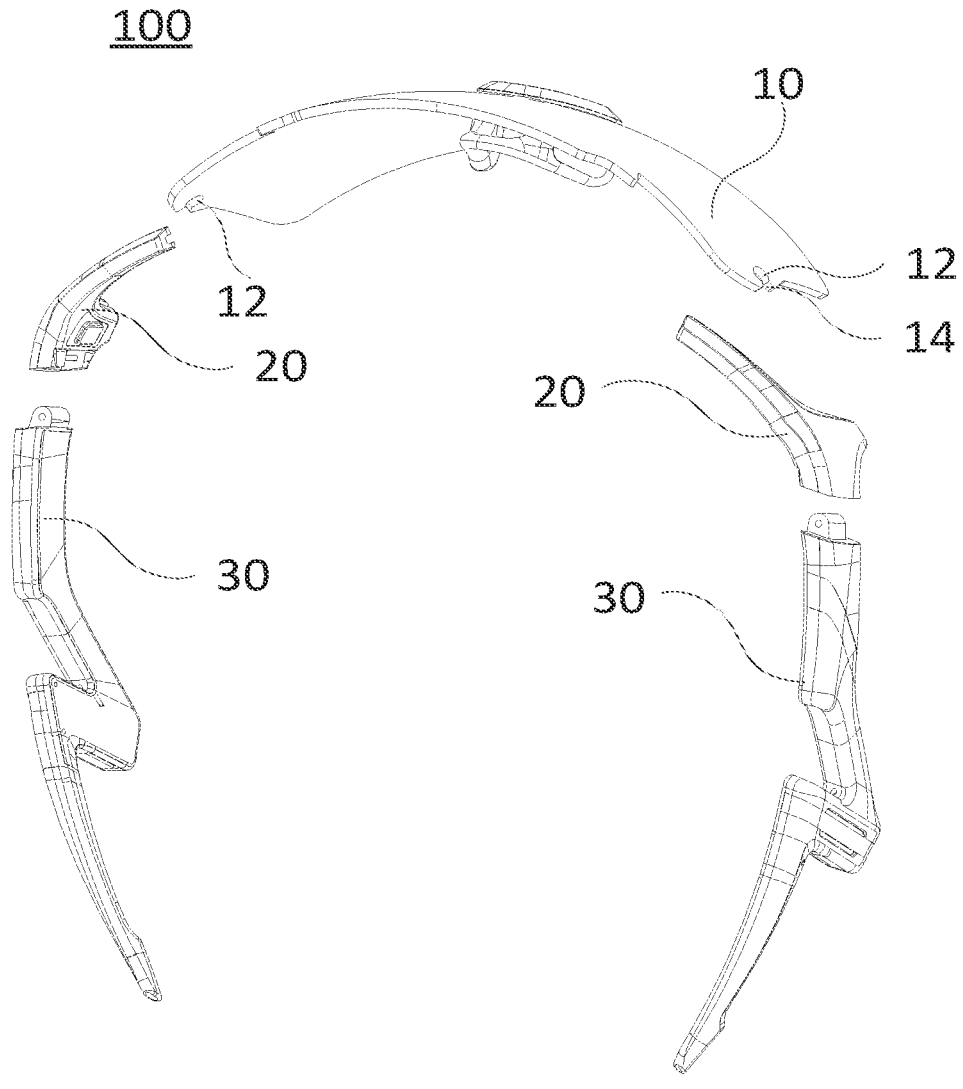
FIG. 2 is a schematic diagram illustrating a decomposed structure of the wearable device shown in FIG. 1.

The present disclosure provides a wearable device 100. Referring to FIG. 1 and FIG. 2 in combination, FIG. 1 is a schematic diagram illustrating a structure of a wearable device according to an embodiment of the present disclosure, and FIG. 2 is a schematic diagram illustrating a decomposed structure of the wearable device shown in FIG. 1.

The wearable device 100 may be functional myopic glasses, presbyopic glasses, cycling glasses, sunglasses, etc., or smart glasses, such as audio glasses with headset function. The wearable device 100 may also be a head wear device such as a helmet, an AR device, or a VR device. The wearable device 100 may also be a hand wear device such as a functional watch or a smart watch.

The wearable device 100 includes a visible member 10, a quick-release assembly 20, and a wearable member 30. The visible member 10 and the wearable member 30 are respectively connected to two ends of the quick-release assembly 20, and both the visible member 10 and the wearable member 30 can be quickly disassembled from the quick-release assembly 20. The wearable member 30 and the quick-release assembly 20 may also be set as a conventional connection structure or a one-piece structure.

In some embodiments, the wearable device 100 is a head wear device, and the visual member 10 may be a lens, a display screen, or a display screen with a lens function. The visual member 10 may also be a lens and its auxiliary components or a display screen and its auxiliary components. The auxiliary components may be a lens frame or a frame, etc., to facilitate its interconnection with the quick-release assembly 20.

In some embodiments, the visible member 10 may also be a dial structure with display function.

In some embodiments, the wearable device 100 is glasses, the visual member 10 is a lens frame, and the wearing member 30 is a temple. The wearable device 100 includes a visual member 10, two groups of quick-release assemblies 20, and two groups of wearing members 30. The two groups of quick-release assemblies 20 are arranged at the two ends of the visual member 10, respectively, and the two groups of wearing members 30 are respectively connected to a corresponding group of quick-release assemblies 20.

In some embodiments, the wearing member 30 may be a headband or a watch strap, etc. The two ends of the wearing member 30 may be respectively connected to a corresponding group of quick-release assemblies 20. The wearing member 30 may also be connected to a group of quick-release assemblies 20 at one end and directly connected to the visible member 10 at the other end.

Figure 3:
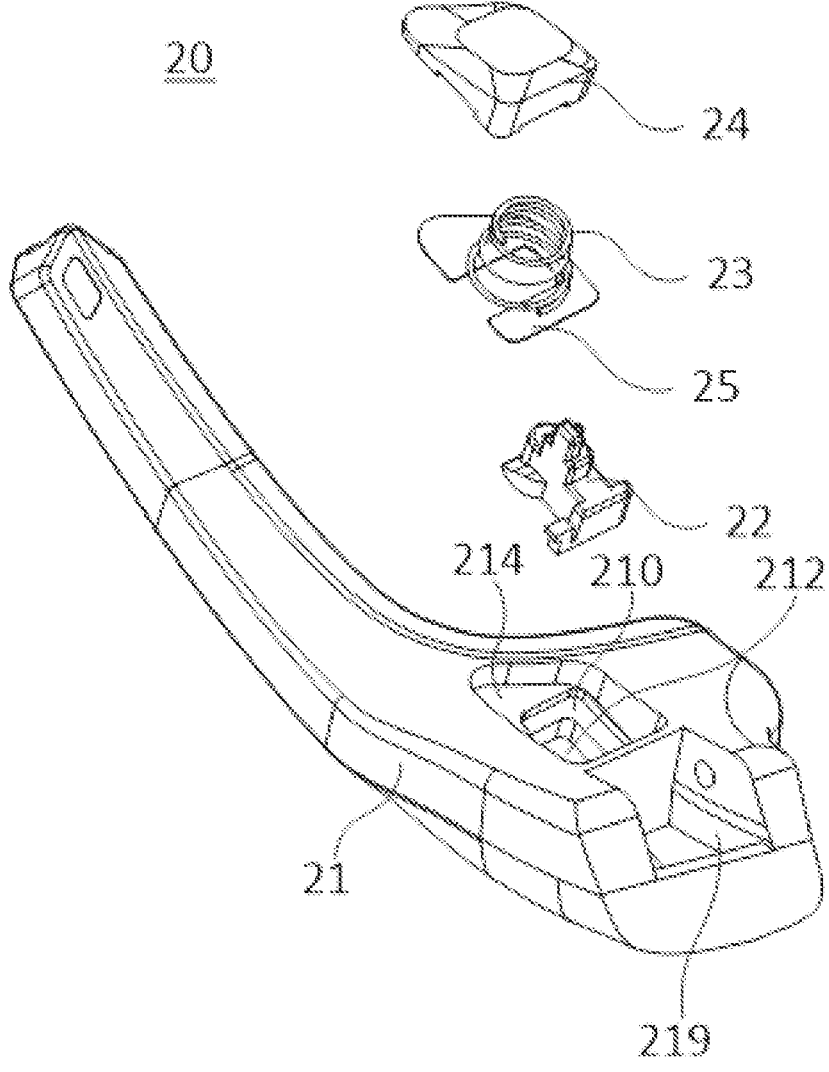
FIG. 3 is a schematic diagram illustrating a decomposed structure of a quick-release assembly in the wearable device shown in FIG. 2.
Figure 4:
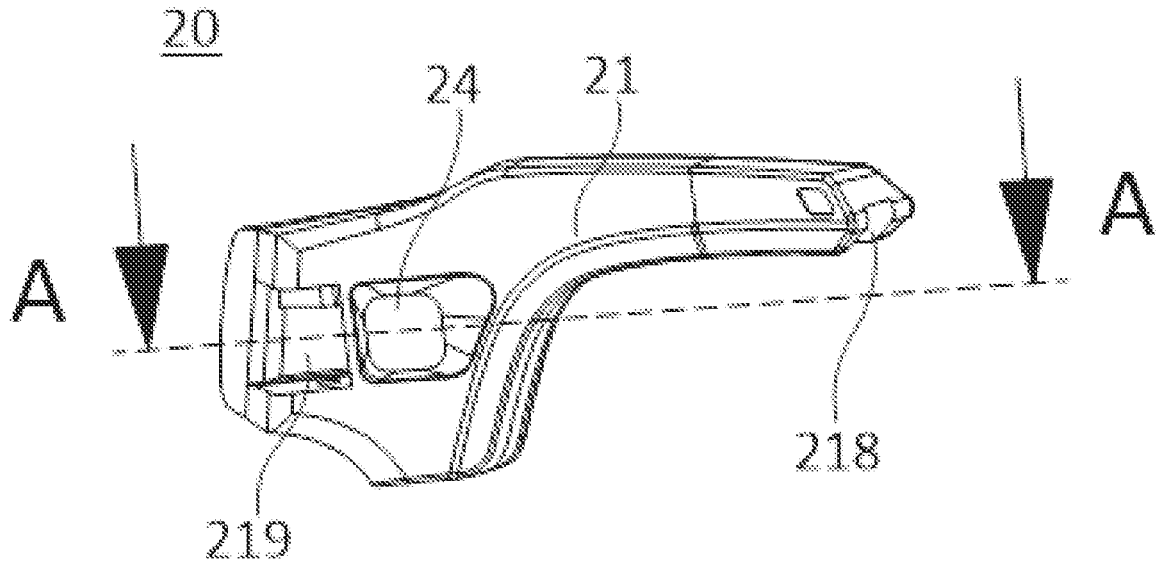
FIG. 4 is a side view of a structure of the quick-release assembly shown in FIG. 3.
Figure 5:
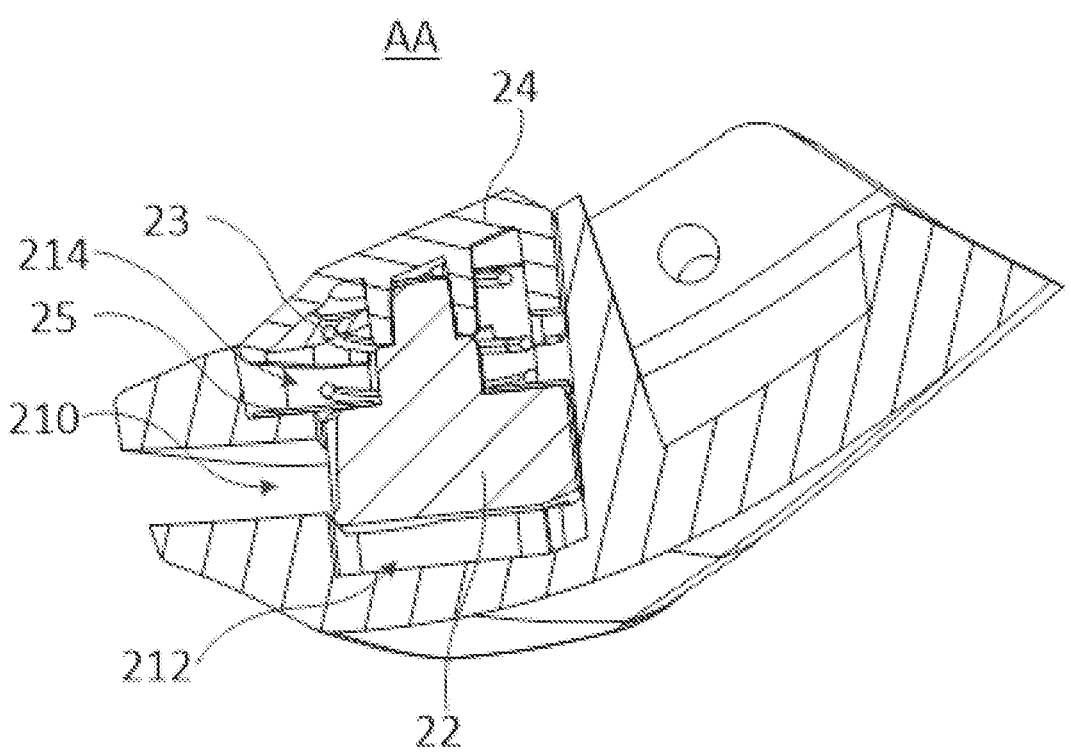
FIG. 5 is a cross-sectional view of a structure of the quick-release assembly shown in FIG. 4 along an AA direction.
Figure 6:
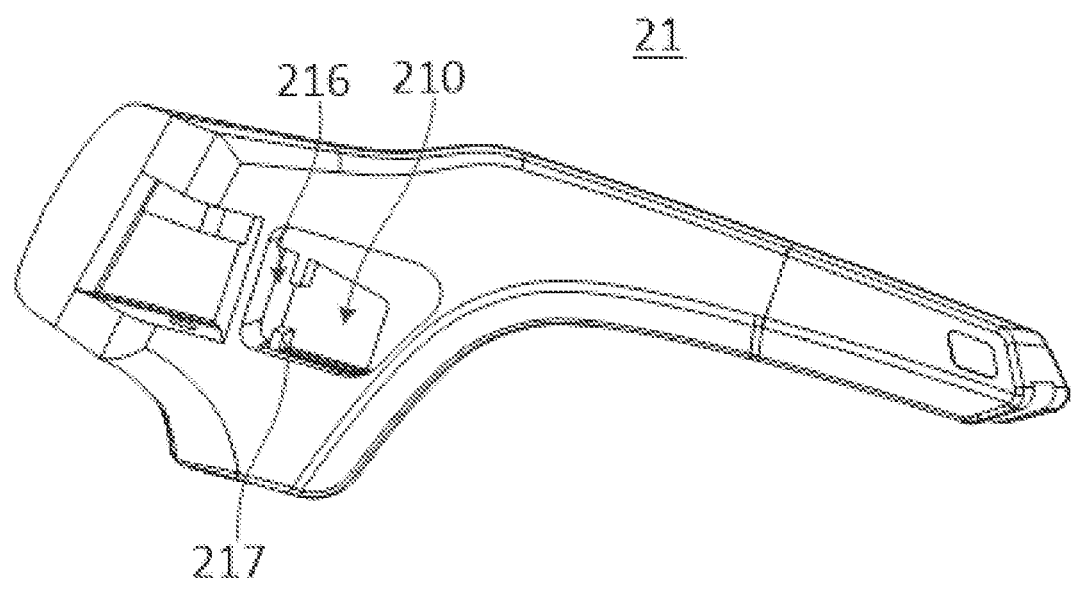
FIG. 6 is a schematic diagram illustrating a structure of a mounting base in the quick-release assembly shown in FIG. 3.
Figure 7:
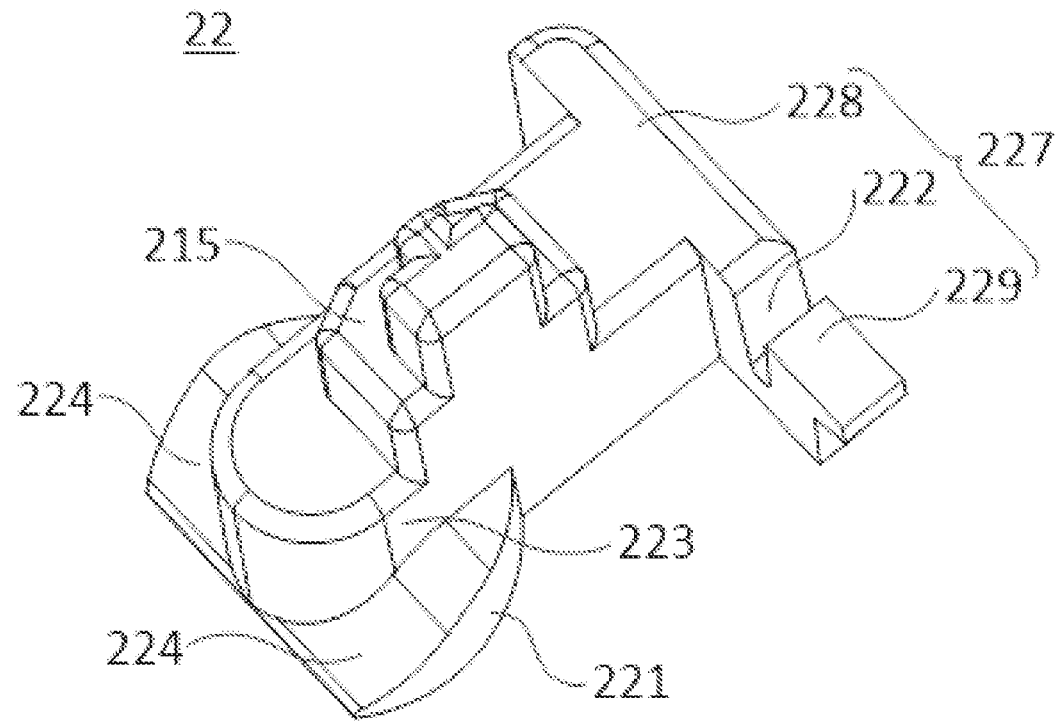
FIG. 7 is a schematic diagram illustrating a structure of a locking member in the quick-release assembly shown in FIG. 3.

Referring to FIGS. 2 to 7, wherein FIG. 3 is a schematic diagram illustrating a decomposed structure of a quick-release assembly in the wearable device shown in FIG. 2, FIG. 4 is a side view of a structure of the quick-release assembly shown in FIG. 3, FIG. 5 is a cross-sectional view of a structure of the quick-release assembly shown in FIG. 4 along an AA view direction, FIG. 6 is a schematic diagram illustrating a structure of a mounting base in the quick-release assembly shown in FIG. 3, and FIG. 7 is a schematic diagram illustrating a structure of a locking member in the quick-release assembly shown in FIG. 3.

The quick-release assembly 20 includes a mounting base 21 and a locking member 22. The mounting base 21 is provided with an insertion cavity 210. The insertion cavity 210 has an opening formed on a side of the mounting base 21. An accommodation cavity 212 is provided in the mounting base 21 and spatially connected to the insertion cavity 210. The locking member 22 includes a locking portion 221 and an unlocking portion 223 connected to the locking portion 221. The locking member 22 is movably disposed on the mounting base 21 along a direction connecting the accommodation cavity 212 and the insertion cavity 210. The locking member 22 has a first state and a second state relative to the mounting base 21. In the first state, at least a portion of the locking portion 221 is disposed within the insertion cavity 210 to lock a visual member 10 that enters the insertion cavity 210 through the opening. In the second state, the locking portion 221 is accommodated within the accommodation cavity so that the unlocking portion 223 replaces the locking portion 221 to cooperate with the visual member 10, thereby releasing the lock of the visual member 10, and in this state, the visual member 10 may be taken out from the insertion cavity 210 and separated from the mounting base 21.

Specifically, the visual member 10 is provided with a locking hole 12 and a channel 14 spatially connected to the locking hole 12. When the visual member 10 is inserted into the insertion cavity 210, the locking portion 221 is located in the locking hole 12 to restrict the visual member 10 to be fixed relative to the insertion cavity 210. A diameter of the locking hole 12 is larger than a width of the channel 14, the unlocking portion 223 may pass through the channel 14, and the locking portion 221 cannot pass through the channel 14. Thus, when the locking portion 221 is located in the locking hole 12, i.e., in the first state, the locking portion 221 may be restricted to fix the visual member 10 relative to the insertion cavity 210, and when the unlocking portion 223 is located in the locking hole 12 instead of the locking portion 221, i.e., in the second state, the lock of the visual member 10 may be released, so that the visual member 10 may be taken out from the insertion cavity 210.

During a disassembly process of the visual member 10 and the quick-release assembly 20, the locking member 22 is adjusted so that the unlocking portion 223 replaces the position of the locking portion 221 and is located in the locking hole 12, i.e., switches from the first state to the second state, and the visual member 10 is twitched relative to the insertion cavity 210 so that the unlocking portion 223 passes through the channel 14 and disengages from the locking hole 12, accordingly, the visual member 10 is detached from the mounting base 21.

By setting the insertion cavity 210 on the mounting base 21, the locking member 22 is disposed on the mounting base 21 and passes through the insertion cavity 210, and the position of the locking member 22 is adjustable, so that the locking portion 221 or the unlocking portion 223 may be adjusted to fit with the locking hole 12 on the visual member 10 by switching the first state and the second state of the locking member 22, so as to lock the visual member 10 inserted into the insertion cavity 210 or release the lock of the visual member 10, thereby improving the disassembly efficiency between the visual member 10 and the mounting base 21.

The position of the locking member 22 may be adjusted by pressing or rotating, i.e., switching between the first state and the second state, so that the unlocking portion 223 and the locking portion 221 may alternately fit with the locking hole 12 to facilitate disassembly and assembly between the visible member 10 and the mounting base 21.

In some embodiments, the locking member 22 is switched between the first state and the second state by pressing.

Specifically, the locking member 22 is slidably arranged on the mounting base 21. The quick-release assembly 20 further includes an elastic member 23 arranged on the mounting base 21. The locking member 22 is switched from the first state to the second state by pressing the locking member 22, the locking member 22 compresses the elastic member 23, the elastic member 23 provides an elastic force to drive the locking member 22 to switch from the second state to the first state.

Specifically, in the first state, the user applies pressure to the locking member 22 to cause the locking member 22 to switch from the first state to the second state and compress the elastic member 23. The elastic member 23 accumulates the elastic force, and after the user removes the pressure, the elastic member 23 provides the elastic force to drive the locking member 22 to switch from the second state to the first state. Thus, by providing the elastic member 23, the operation convenience of the quick-release assembly 20 may be further improved, which makes it more convenient for the user to disassemble and assemble the visible member 10 by the quick-release assembly 20.

In the second state, the elastic member 23 is compressed, the locking portion 221 is accommodated in the accommodation cavity 212, and the visual member 10 is inserted into the insertion cavity 210, so that the locking hole 12 cooperates with the unlocking portion 223, and then the elastic member 23 rebounds and the locking portion 221 replaces the unlocking portion 223 to cooperate with the locking hole 12, so that the locking member 22 switches from the second state to the first state to lock the visual member 10. When unlocking, the locking member 22 is pressed to cause the elastic member 23 to be compressed, i.e., the unlocking portion 223 replaces the locking portion 221 to be assembled with the locking hole 12, so that the locking member 22 is switched from the first state to the second state, and then the visual member 10 may be pulled out, and the unlocking portion 223 passes through the locking hole 12 and the channel 14 in sequence, thereby releasing the connection between the visual member 10 and the quick-release assembly 20.

The elastic member 23 may be a compression spring, an elastic column, a shrapnel, a spring, or an elastic pad, etc., which may be deformed and squeezed by an external force and return to its original state after the external force is removed. By providing the elastic member 23, the locking portion 221 is maintained in the insertion cavity 210 without external force interference, and after the external force is removed, the elastic member 23 rebounds to make the locking portion 221 located in the insertion cavity 210, which improves the reliability of the fixing of the visible member 10 and the user's operation convenience and is more user-friendly.

In some embodiments, the locking member 22 may be adjusted by rotating.

For example, the mounting base 21 is provided with a screw hole, the locking member 22 is provided with a screw thread, and the locking member 22 may be threadedly connected with the mounting base 21. The position of the locking member 22 relative to the mounting base 21 is adjusted by rotating the screw thread to switch the first state and the second state of the locking member 22.

Further, the mounting base 21 is further provided with a guide cavity 214 that is on a side of the mounting base 21 away from the accommodation cavity 212 and spatially connected to the insertion cavity 210. The quick-release assembly 20 further includes a push member 24. The push member 24 is connected to one end of the locking member 22 away from the accommodation cavity 212 and is slidably arranged in the guide cavity 214 so that the push member is allowed to be pressed to cause the locking member 22 to switch from the second state to the first state.

The push member 24 may be connected to the locking member 22 by gluing or plugging, etc.

The push member 24 is able to provide a large pressing area to improve the user's comfort when pressing, and the push member 24 is slidably connected to the guide cavity 214, which can improve the smoothness of the user's pressing.

In some embodiments, as shown in FIGS. 3 and 5, the elastic member 23 is elastically compressed and supported between a bottom wall of the guide cavity 214 and the push member 24, so that the elastic member 23 is compressed when the push member 24 is pressed.

The locking member 22 is mounted on the mounting base 21 by the guide cavity 214. Specifically, the guide cavity 214 and the accommodation cavity 212 are spatially connected to the insertion cavity 210, and the guide cavity 214 and the accommodation cavity 212 are arranged on both sides of the insertion cavity 210 along a direction connecting the guide cavity and the accommodation cavity. The locking member 22 is movably mounted on the insertion cavity 210 and the accommodation cavity 212 by the guide cavity 214.

Further, the quick-release assembly 20 further includes a gasket 25. The gasket 25 is supported by the bottom wall of the guide cavity 214. The gasket 25 partially covers a connection port between the guide cavity 214 and the insertion cavity 210 to at least partially cover the locking portion 221. One end of the elastic member 23 is supported on the gasket 25. By providing the gasket 25, a support area of supporting the elastic member 23 may be increased to enhance the support stability of the elastic member 23.

In some embodiments, as shown in FIG. 7, the locking member 22 further includes a connection portion 215 arranged at one end of the unlocking portion 223. A cross-sectional area of the connection portion 215 in a direction connecting the accommodation cavity and the insertion cavity is smaller than a cross-sectional area of the unlocking portion 223 in the same direction. The connection portion 215 passes through the gasket 25, and both the locking portion 221 and the unlocking portion 223 are located on a side of the gasket 25 away from the guide cavity 214. The unlocking portion 223 is restricted and blocked by the gasket 25.

The locking portion 221 may be connected to an outer side wall of the unlocking portion 223 or an end of the unlocking portion 223 away from the connection portion

215. A width of the locking portion 221 is greater than a width of the channel 14, and the width of the channel 14 is greater than a width of the unlocking portion 213, so that the locking portion 221 cannot pass through the channel 14, but the unlocking portion 213 can pass through the channel 14.

In some embodiments, the locking portion 221 and the unlocking portion 223 may be shaft segments with different shaft diameters, and the shaft diameter of the locking portion 221 is larger than the shaft diameter of the unlocking portion 223. Alternatively, the locking portion 221 and the unlocking portion 223 are arranged in a step manner, the locking portion 221 and the unlocking portion 223 may be a rod or a cylinder, and a cross-sectional area of the locking portion 221 in the direction connecting the accommodation cavity and the insertion cavity is greater than a cross-sectional area of the unlocking portion 223 in the direction.

Referring to FIGS. 5 and 7, the locking portion 221 is further provided with a guide surface 224 facing the opening of the insertion cavity 210, so that when the visual member 10 is assembled in the insertion cavity 210, the visual member 10 presses the locking member 22 through the guide surface 224 to cause the locking member 22 to switch from the first state to the second state, and when the visual member 10 is assembled in the insertion cavity 210, the guide surface 224 is out of contact with the visual member 10 to cause the elastic member 23 to drive the locking member 22 to switch from the second state to the first state.

Thus, by setting the guide surface 224 on the locking portion 221, when the visual member 10 is assembled with the quick-release assembly 20, the visual member 10 may be directly inserted into the insertion cavity 210 without pressing the press member 24 to complete the assembly of the visual member 10 and the quick-release assembly 20. In other words, during the process of inserting the visual member 10 into the insertion cavity 210, the locking member 22 automatically switches from the initial first state to the second state, and after the assembly is completed, the locking member 22 automatically switches from the second state to the first state under the drive of the elastic member 23, that is, during the whole assembly process, the user does not need to press the push member 24 first, which relatively reduces the assembly action and enables the user to complete the assembly of the visual member 10 and the quick-release assembly 20 with one hand, thereby greatly improving the assembly convenience.

Figure 8:
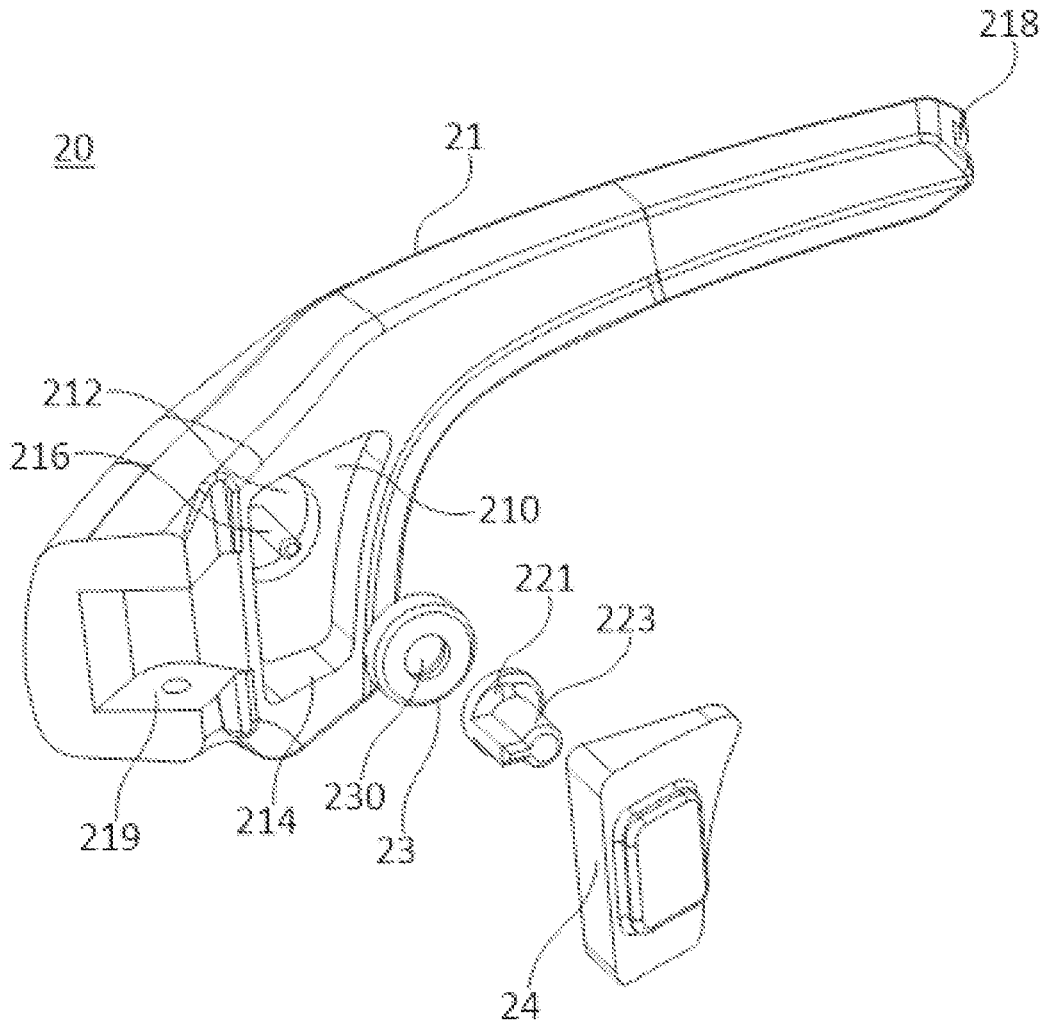
FIG. 8 is a schematic diagram illustrating a decomposed structure of a quick-release assembly in the wearable device shown in FIG. 2.
Figure 9:
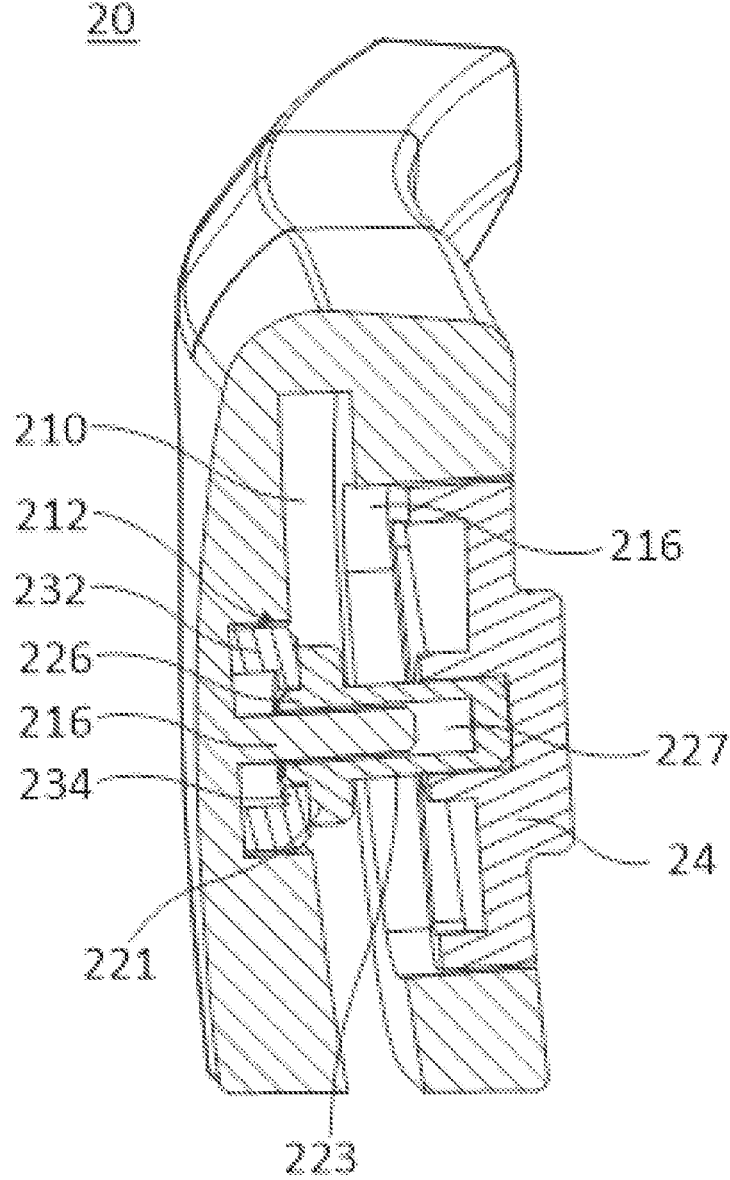
FIG. 9 is a cross-sectional view of a structure of the quick-release assembly shown in FIG. 8.

Referring to FIG. 8 and FIG. 9, FIG. 8 is a schematic diagram illustrating a decomposed structure of a quick-release assembly in the wearable device shown in FIG. 2, and FIG. 9 is a cross-sectional view of a structure of the quick-release assembly shown in FIG. 8.

As shown in FIGS. 8 and 9, in other embodiments, the elastic member 23 is elastically compressed and arranged on a bottom wall of the accommodation cavity 212 and an end of the locking portion 221 away from the unlocking portion 223.

The elastic member 23 may be a compression spring, which may be directly supported between the bottom wall of the accommodation cavity 212 and the locking portion 221.

The elastic member 23 may be a silicone member, etc. One end of the elastic member 23 is fixed to the bottom wall of the accommodation cavity 212, and the other end of the elastic member 23 is provided with an embedding hole 230. An end of locking portion 221 toward the elastic member 23 is provided with an embedding portion 226, and the embedding portion 226 is assembled in the embedding hole 230.

The elastic member 23 is a silicone member, and the elastic member 23 includes a cylindrical portion 232 and a support flange 234. The support flange 234 is arranged on one end of the cylindrical portion 232 toward the locking member 22 and extends along a radial direction of the cylindrical portion 232 toward a central axis of the cylindrical portion 232. The locking portion 221 is supported by the support flange 234, and the embedding hole 230 is arranged on the support flange 234.

In some embodiments, the elastic member 23 includes only the cylindrical portion 232. An embedding hole 230 is formed on an end of the cylindrical portion 232 facing the locking member 22.

Figure 10:
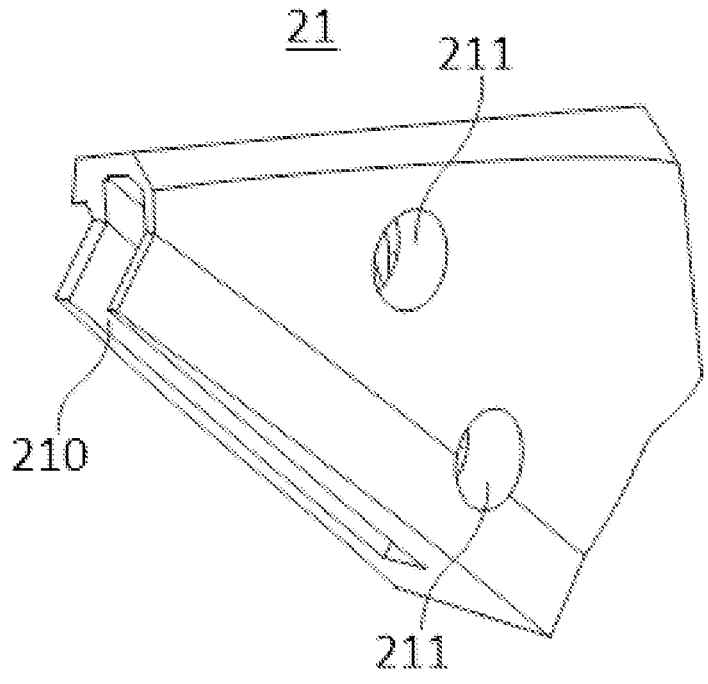
FIG. 10 is a schematic diagram illustrating a structure of a mounting base in a quick-release assembly in the wearable device shown in FIG. 2.
Figure 11:
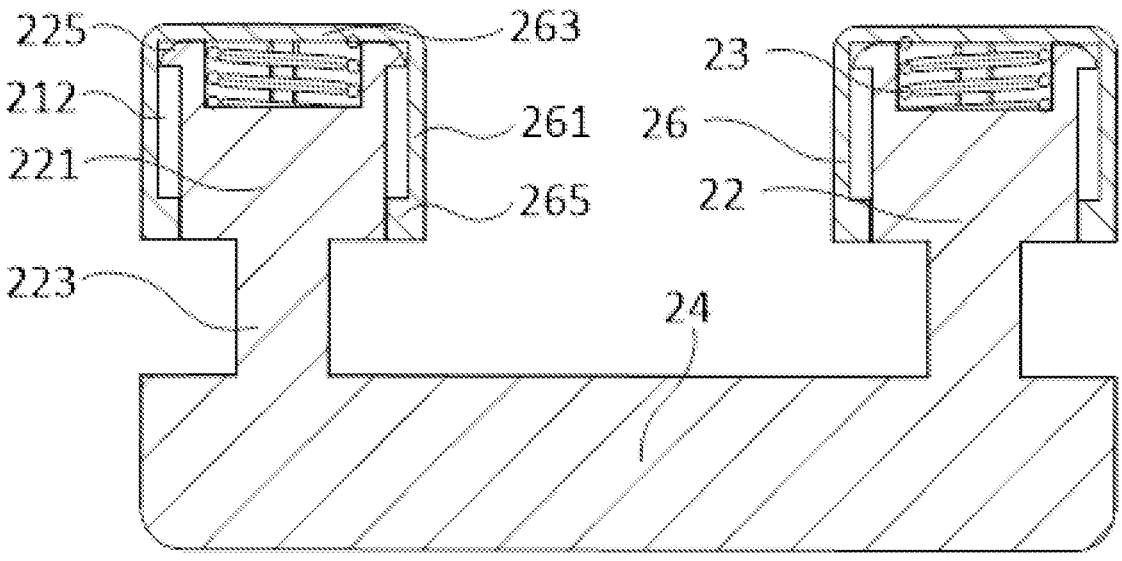
FIG. 11 is cross-sectional structures of a locking member, an elastic member, a positioning cover, and a push member of the quick-release assembly shown in FIG. 10.

Referring to FIG. 10 and FIG. 11, FIG. 10 is a schematic diagram illustrating a structure of a mounting base in a quick-release assembly in the wearable device shown in FIG. 2, and FIG. 11 is cross-sectional structures of a locking member, an elastic member, a positioning cover, and a push member of the quick-release assembly shown in FIG. 10.

In some embodiments, the quick-release assembly 20 further includes a positioning cover 26. The positioning cover 26 is arranged on the mounting base 21 to form the accommodation cavity 212. The elastic member 23 is elastically compressed and arranged between the positioning cover 26 and the locking portion 221.

For example, the mounting base 21 is provided with a through-hole 211. The positioning cover 26 is arranged in the through-hole 211 and connected to the through-hole 211 by, for example, interference assembly, screwing, gluing, etc., to form the accommodation cavity 212. The locking member 22 may be slidably connected to the positioning cover 26 and its position is limited by the positioning cover 26, or the locking member 22 is arranged in a restriction ring provided in a side wall of the through-hole 211 and its position is limited by the restriction ring.

The positioning cover 26 includes a cylinder body 261, a cylinder body bottom wall 263 arranged on one end of the cylinder body 261, and a blocking ring 265 arranged on the other end of the cylinder body 261. One end of the locking portion 221 away from the unlocking portion 223 is provided with a buckle 225. The elastic member 23 is arranged between the cylinder body bottom wall 263 and the locking portion 221. The locking portion 221 is slidable relative to the cylinder body 261. The buckle 225 cooperates with the blocking ring 265 to restrict the locking member 22 from detaching from the positioning cover 26.

The end of the locking portion 221 may have the buckle 225 in a form of a ring. A count of the buckle 225 may be multiple, which may be three, four, or five, etc. The multiple buckles 225 are arranged around the end of the locking portion 221. The buckle 225 is provided with a guide surface, so that the buckle 225 is inserted into the cylinder body 261 through the blocking ring 265 and blocked by the blocking ring 265.

In some embodiments, the positioning cover 26 may be a flat cover. The blocking ring 265 may be arranged on the side wall of the through-hole 211 on the mounting base 21. The locking member 22 passes through the blocking ring 265 from one end of the through-hole 211. The buckle 225 may be blocked by the blocking ring 265. The positioning cover 26 covers the through-hole 211, the elastic member 23 is located in the through-hole 211 and elastically compressed between the flat cover and the locking portion 221.

Further, there may be a group of the locking member 22, the elastic member 23, and the positioning cover 26, and in such cases, the push member 24 may not be required, and one end of the locking member 22 may serve as a push member.

In some embodiments, there may be multiple groups of the locking member 22, the elastic member 23, and the positioning cover 26, and one end of each locking member 22 in the multiple groups is connected to the push member 24. By pressing the push member 24, the lock of the multiple locking members 22 to the multiple visible members 10 is released at the same time, which improves the unlocking efficiency.

In some embodiments, there may be two groups of the locking member 22, the elastic member 23, and the positioning cover 26, which can effectively fix the visible member 10. There may be three groups, or, four groups, and other numbers of the locking member 22, the elastic member 23 and the positioning cover 26.

Further, the locking portion 221 cooperates with a side wall of the accommodation cavity 212. Alternatively, as shown in FIG. 9, the locking member 22 is further provided with a first guide portion 227, and the mounting base 21 is provided with a second guide portion 216 cooperating with the first guide portion 227 to further improve the cooperating fluidity and stability between the locking member 22 and the mounting base 21 and avoid the jamming between the locking member 22 and the mounting base 21.

In some embodiments, as shown in FIG. 9, the first guide portion 227 is a guide hole, and the second guide portion 216 is a guide rod arranged on a bottom wall of the accommodation cavity 212. The guide hole and the guide rod are slidably assembled.

In some embodiments, as shown in FIGS. 6 and 7, the first guide portion 227 is a guide block arranged on one side of the locking member 22, and the second guide portion 216 is a guide slot arranged on the mounting base 21. One side of the guide slot is spatially connected to the insertion cavity 210 and the accommodation cavity 212.

Specifically, a blocking wall 217 is provided between the guide slot, the insertion cavity 210, and the accommodation cavity 212. The blocking wall 217 is provided with a connection port connecting the guide slot and the insertion cavity 210. The unlocking portion 223 passes through the accommodation cavity 212. The guide block is located in the guide slot on one side of the blocking wall 217. The blocking wall 217 is used to block the guide block to block and restrict the guide block from a vertical direction of the direction connecting the accommodation cavity and the insertion cavity, which improves the restriction stability of the visible member 10 to the visible member 10 and avoids the loosening of the visible member 10.

The guide block includes a guide portion 228 and an elastic portion 229. One end of the elastic portion 229 is connected to the guide portion 228 and forms an elastic gap 222 with the guide portion 228. The elastic portion 229 presses against a side wall of the guide slot to further improve the restriction stability of the locking member 22 to the visible member 10.

When the guide block slides relative to the guide slot, the elastic portion 229 keeps pressing against the side wall of the guide slot at all times, and during this process, the elastic portion 229 may adjust a size of the elastic gap 222 by itself under pressure, which can ensure the smoothness and stability of the slide of the guide block relative to the guide slot, and prevent the locking member 22 from shaking.

As shown in FIG. 4 and FIG. 8, one side of the mounting base 21 is further provided with a positioning slot 218. The positioning slot 218 is used to guide the visual member 10 to insert into the opening of the insertion cavity 210 to improve the assembly and disassembly speed of the visual member 10 and the quick-release assembly 20 and alignment convenience, and cooperate with the insertion cavity 210 to position the visual member 10.

Specifically, in some embodiments, the insertion cavity 210, the positioning slot 218, and the locking portion 221 cooperate to position the visible member 10 to collectively constrain the visible member 10 and restrict a movement of the visible member 10 relative to the quick-release assembly 20.

The positioning slot 218 further extends into the mounting base 21 to form a positioning cavity spaced from the insertion cavity to further improve the constraint stability of the visible member 10.

As shown in FIGS. 4 and 8, one end of the mounting base 21 away from the opening of the insertion cavity 210 is further provided with a rotating connection portion 219. The rotating connection portion 219 is used to hinge the wearing member 30 of the wearable device 100.

The rotating connection portion 219 may be a rotating slot provided with a mounting hole for a rotating shaft or a fixed shaft. The wearing member 30 may be connected to the rotating connection portion 219 by the fixed shaft or a bolt, etc.

The rotating connection portion 219 may be a hinge slot or hinge protrusion which may be fitted with a hinge protrusion or hinge slot on the wearing member 30 to achieve a hinge relationship between the quick-release assembly 20 and the wearing member 30.

In some embodiments, referring to FIG. 2, the wearing member 30 is detachably connected to the mounting base 21. The wearing member 30 may or may not be rotatable relative to the mounting base 21. In other embodiments, the wearing member 30 may be fixedly connected to the mounting base 21 by, for example, welding or gluing, or the wearing member 30 and the mounting base 21 have an integrated structure, such as integral injection molding or integral casting, so that the mounting base 21 may be considered as a part of the wearing member 30.

Further, the wearing member 30 and the mounting base 21 are detachably connected, which may facilitate the replacement of wearing members 30 with different lengths or mounting base 21 with different lengths, so as to better meet the user's needs.

Figure 12:
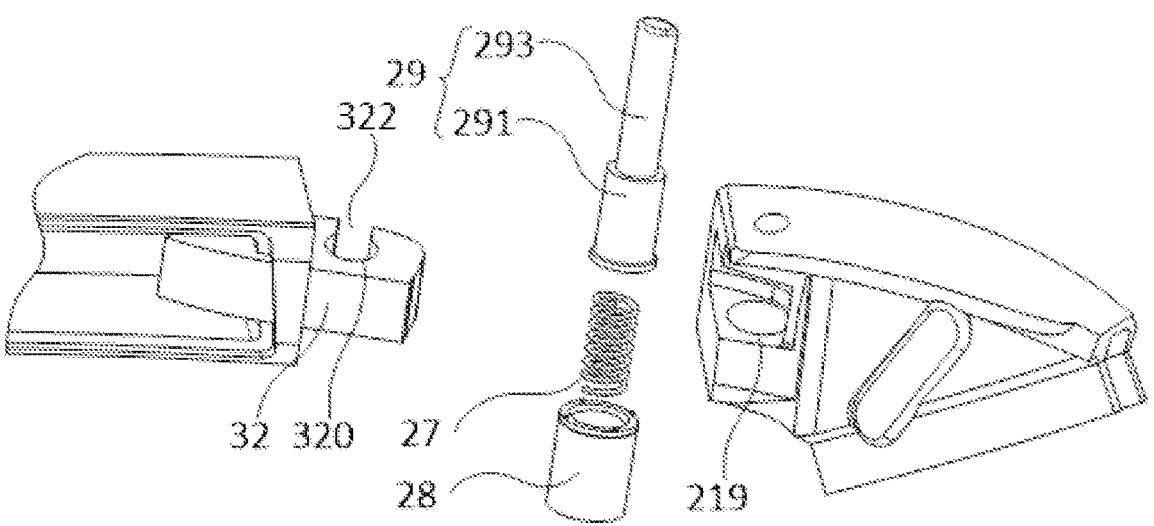
FIG. 12 is a schematic diagram illustrating a first embodiment of a connection between the mounting base and a wearing member in the wearable device shown in FIG. 2.

Referring to FIG. 12, FIG. 12 is a schematic diagram illustrating a first embodiment of a connection between the mounting base and the wearing member in the wearable device shown in FIG. 2. In some embodiments, the wearing member 30 is detachably and rotatably connected to the mounting base 21. The rotating connection portion 219 is a rotating connection slot. One end of the wearing member 30 is provided with an insertion portion 32, the insertion portion 32 is detachably connected to the rotating connection slot. The wearing member 30 may rotate relative to the mounting base 21, so that the wearing member 30 may rotate toward the visible member 10 to be folded on one side of the visible member 10, so as to facilitate the storage of the wearable device 100.

In the first embodiment, as shown in FIG. 12, the quick-release assembly 20 also includes a locking teeth 29, a spring 27, and a positioning cylinder 28. The locking teeth 29 have the same structure as the locking member 22 in FIG. 11, the spring 27 has the same structure as the elastic member 23 in FIG. 11, and the positioning cylinder 28 has the same structure as the positioning cover 26 in FIG. 11.

The locking teeth 29 include a first locking tooth portion 291 and a second locking tooth portion 293 arranged coaxially. The positioning cylinder 28 is arranged on the mounting base 21. The locking teeth 29 and the positioning cylinder 28 are slidably arranged. The locking teeth 29 pass through the rotating connection slot. The spring 27 is elastically compressed and arranged between the positioning cylinder 28 and the locking teeth 29. The insertion portion 32 is provided with a rotation hole 320 and a channel 322 spatially connected with the rotation hole 320. The insertion portion 32 is arranged in the rotating connection slot. The first locking tooth portion 291 is located in the rotation hole 320 and rotatably cooperated with the rotation hole 320. One end of the locking teeth 29 is pressed, so that the second locking tooth portion 293 replaces a position of the first locking tooth portion 291 and is located in the rotation hole 320, and the second locking tooth portion 293 and the rotation hole 320 are separated through the channel 322 to remove the wearing member 30, otherwise, the wearing member 30 may be assembled on the mounting base 21, therefore the disassembly and assembly of the wearing member 30 and the mounting base 210 is quick and convenient.

Figure 13:
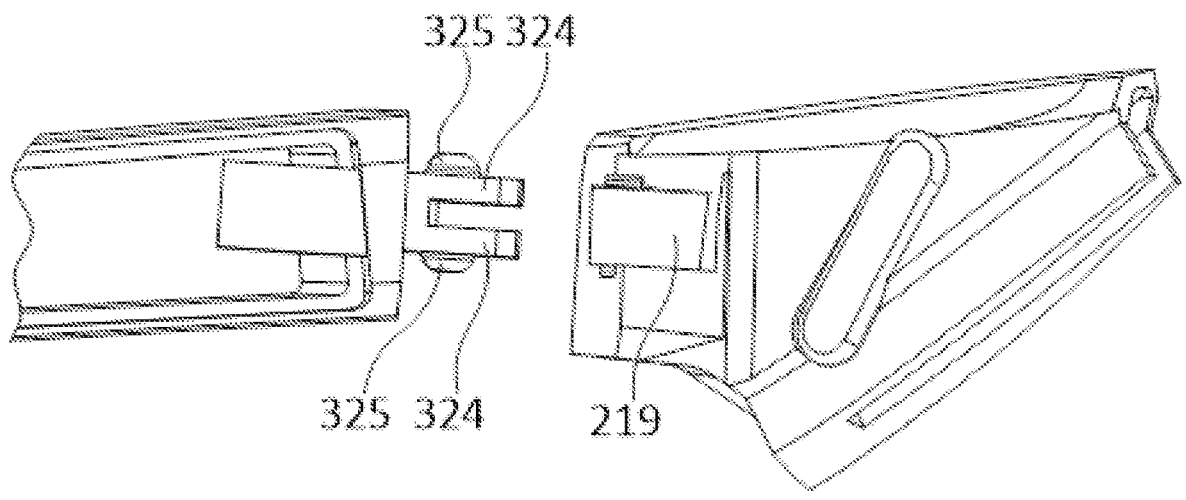
FIG. 13 is a schematic diagram illustrating a second embodiment of a connection between the mounting base and the wearing member in the wearable device shown in FIG. 2.
Figure 14:
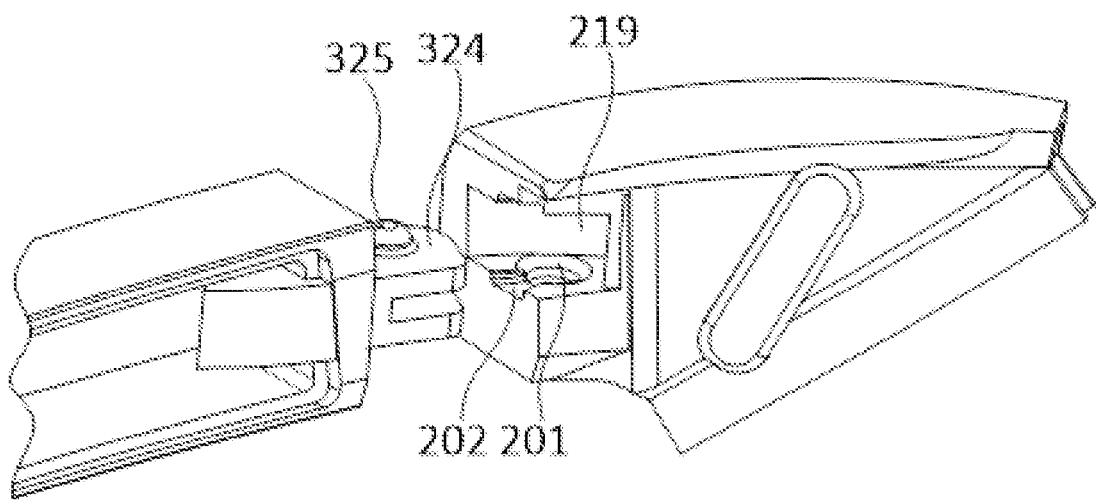
FIG. 14 is a schematic diagram illustrating a structure in another viewing angle of the connection between the mounting base and the wearing member shown in FIG. 13.

Referring to FIG. 13 and FIG. 14, FIG. 13 is a schematic diagram illustrating a second embodiment of a connection between the mounting base and the wearing member in the wearable device shown in FIG. 2, and FIG. 14 is a schematic diagram illustrating a structure in another viewing angle of the connection between the mounting base and the wearing member shown in FIG. 13.

In the second embodiment, the insertion portion 32 includes two extension sub-portions 324 disposed at intervals. Sides of the two extension sub-portions 324 facing away from each other are respectively provided with a snap convex block 325. Sides wall of the rotating connection slot is provided with two snap slots 201 that cooperate with the two snap convex blocks 325, and each snap convex block 325 is snapped in the corresponding snap slot 201.

The two extension sub-portions 324 are disposed at intervals, and there is an interval cavity between the two extension sub-portions 324, so that when the two snap convex blocks 325 are assembled with the two snap slots 201, the two snap convex blocks 325 are pressed against the side wall of the rotating connection slot to make the two extension sub-portions 324 to be close to each other, so as to facilitate the snap convex blocks 325 enter the rotating connection slot and snap with the snap slots 201. After the snap convex blocks 325 are snapped into the snap slots 201, the two extension sub-portions 324 return to their original state, so that the connection between the snap convex blocks 325 and the snap slots 201 is more secure, and the rotation of the wearing member 30 may drive the snap convex blocks 325 to rotate in the snap slots 201.

Further, the side walls of the rotating connection slot may be respectively provided with a guide slot 202 spatially connected to the corresponding snap slot 201. A distance between the bottoms of two guide slots 202 is less than a distance between opposite ends of the two snap convex blocks 325 to reduce the degree of extrusion and deformation of the two extension sub-portions 324, so that the snap convex blocks 325 are easier to install in the snap slots 201. A distance between the bottoms of the two snap slots 201 is greater than the distance between the opposite ends of the two snap convex blocks 325 to release the extrusion of the snap slots 201 to the snap convex blocks 325 and facilitate the two extension sub-portions 324 to restore their original state, thereby improving the firmness of the connection between the insertion portion 32 and the rotating connection slot.

The snap convex blocks 325 may be in a hemispherical shape or a cylindrical shape, etc., to facilitate the rotation between the wearing member 30 and the mounting base 21.

Figure 15:
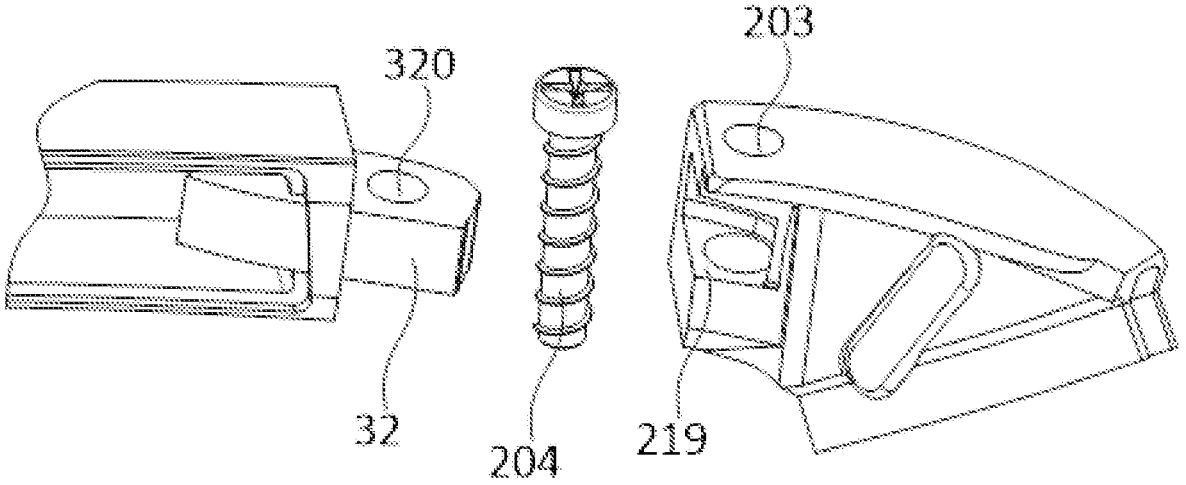
FIG. 15 is a schematic diagram illustrating a third embodiment of a connection between the mounting base and the wearing member in the wearable device shown in FIG. 2.

Referring to FIG. 15, FIG. 15 is a schematic diagram illustrating a third embodiment of a connection between the mounting base and the wearing member in the wearable device shown in FIG. 2. In the third embodiment, the insertion portion 32 is provided with a rotating hole 320. The quick-release assembly 20 includes a fastener 204. The mounting base 21 is provided with a mounting hole 203 for assembly with the fastener 204. The fastener 29 is fixed in the mounting hole 203 and passes through the rotating hole 320, and the rotating hole 320 is rotatably cooperated with the fastener 204. The fastener 204 may be a screw, a stud, a pin, etc., which is not limited in the present disclosure.

Different from the prior art, the present disclosure discloses a wearable device and a quick-release assembly thereof. The insertion cavity is provided on the mounting base, the locking member is disposed on the mounting base and passes through the insertion cavity, and the position of the locking member is adjustable, so that the locking portion or the unlocking portion can be adjusted to fit with the locking hole on the visual member by switching the first state and the second state of the locking member, so as to lock the visual member inserted into the insertion cavity or unlock the visual member, thereby improving the efficiency of disassembly and assembly between the visual member and the mounting base, and thus, the efficiency of the disassembly and assembly of the visual member and the quick release assembly is very efficient and convenient.

The above descriptions are related to exemplary embodiments of the present disclosure and are not intended to limit the scope of the present disclosure. Any equivalent structure or equivalent process made by using the contents of the specification of the present disclosure and the drawings or any direct or indirect application in other related technical fields are included in the scope of protection of the present disclosure.

What is claimed is:

1. A quick-release assembly applied to a wearable device, wherein the quick-release assembly comprises:

a mounting base provided with an insertion cavity, the insertion cavity having an opening formed on a side of the mounting base, an accommodation cavity being provided in the mounting base and spatially connected to the insertion cavity; and a locking member including a locking portion and an unlocking portion connected to the locking portion, the locking member being movably disposed on the mounting base along a direction connecting the accommodation cavity and the insertion cavity, wherein the locking member has a first state and a second state relative to the mounting base, in the first state, at least a portion of the locking portion is disposed within the insertion cavity to lock a visual member that enters the insertion cavity through the opening, and in the second state, the locking portion is accommodated within the accommodation cavity to release the lock of the visual member, the locking member is further provided with a first guide portion, and the mounting base is provided with a second guide portion cooperating with the first guide portion, the first guide portion is a guide block arranged on one side of the locking member, and the second guide portion is a guide slot arranged on the mounting base, a blocking wall is provided between the guide slot, the insertion cavity, and the accommodation cavity, and the blocking wall is configured to block the quide block and provided with a connection port connecting the guide slot, the insertion cavity, and the accommodation cavity.

2. The quick-release assembly of claim 1, wherein the locking member is switched between the first state and the second state by pressing or rotating.

3. The quick-release assembly of claim 2, wherein the locking member is slidably arranged on the mounting base, the quick-release assembly further includes an elastic member arranged on the mounting base, and the locking member is switched from the first state to the second state by pressing the locking member, the locking member compresses the elastic member, and the elastic member provides an elastic force to drive the locking member to switch from the second state to the first state.

4. The quick-release assembly of claim 3, wherein the mounting base is further provided with a guide cavity that is on a side of the mounting base away from the accommodation cavity and spatially connected to the insertion cavity, and the quick-release assembly further includes a push member, the push member being connected to an end of the locking member away from the accommodation cavity and slidably arranged in the guide cavity so that the push member is allowed to be pressed to cause the locking member to switch from the second state to the first state.

5. The quick-release assembly of claim 4, wherein the elastic member is elastically compressed and supported between a bottom wall of the guide cavity and the push member.

6. The quick-release assembly of claim 5, wherein the locking member is mounted on the mounting base by the guide cavity, and the quick-release assembly further includes a gasket, the gasket being supported by the bottom wall of the guide cavity, the gasket partially covering a connection port between the guide cavity and the insertion cavity to at least partially cover the locking portion, one end of the elastic member being supported on the gasket.

7. The quick-release assembly of claim 6, wherein the locking member further includes a connection portion arranged at one end of the unlocking portion, a cross-sectional area of the connection portion in a direction connecting the accommodation cavity and the insertion cavity is smaller than a cross-sectional area of the unlocking portion in the same direction, the connection portion passes through the gasket, and both the locking portion and the unlocking portion are located on a side of the gasket away from the guide cavity, and the unlocking portion is restricted and blocked by the gasket.

8. The quick-release assembly of claim 4, wherein the locking portion is further provided with a guide surface facing the opening, so that when the visual member is assembled in the insertion cavity, the visual member presses the locking member through the guide surface to cause the locking member to switch from the first state to the second state, and the guide surface is out of contact with the visual member to cause the elastic member to drive the locking member to switch from the second state to the first state.

9. The quick-release assembly of claim 4, wherein the guide cavity and the accommodation cavity are spatially connected to the insertion cavity, the guide cavity and the accommodation cavity are arranged on both sides of the insertion cavity along a direction connecting the guide cavity and the accommodation cavity, and the locking member is movably mounted on the insertion cavity and the accommodation cavity by the guide cavity.

10. The quick-release assembly of claim 2, wherein the mounting base is provided with a screw hole, the locking member is provided with a screw thread, and the locking member is threadedly connected with the mounting base, the position of the locking member relative to the mounting base is adjusted by rotating the screw thread to switch the first state and the second state of the locking member.

11. The quick-release assembly of claim 1, wherein the guide block includes a guide portion and an elastic portion, one end of the elastic portion is connected to the guide portion and forms an elastic gap with the guide portion, the elastic portion presses against a side wall of the guide slot.

12. The quick-release assembly of claim 1, wherein one side of the mounting base is further provided with a positioning slot, the positioning slot being used to guide the visual member to insert into the opening of the insertion cavity and cooperate with the insertion cavity to position the visual member.

13. The quick-release assembly of claim 12, wherein one end of the mounting base away from the opening of the insertion cavity is further provided with a rotating connection portion, the rotating connection portion being used to hinge a wearing member of the wearable device.

14. The quick-release assembly of claim 1, wherein the visual member is provided with a locking hole, when the visual member is inserted into the insertion cavity, the locking portion is located in the locking hole to restrict the visual member to be fixed relative to the insertion cavity.

15. A wearable device comprising a visual member and a quick-release assembly, the visual member being inserted into an insertion cavity and locked with a locking member, the quick-release assembly comprising:

a mounting base provided with the insertion cavity, the insertion cavity having an opening formed on a side of the mounting base, an accommodation cavity being provided in the mounting base and spatially connected to the insertion cavity; and the locking member including a locking portion and an unlocking portion connected to the locking portion, the locking member being movably disposed on the mounting base along a direction connecting the accommodation cavity and the insertion cavity, wherein the locking member has a first state and a second state relative to the mounting base, in the first state, at least a portion of the locking portion is disposed within the insertion cavity to lock a visual member that enters the insertion cavity through the opening, and in the second state, the locking portion is accommodated within the accommodation cavity to release the lock of the visual member, the locking member is further provided with a first guide portion, and the mounting base is provided with a second guide portion cooperating with the first guide portion, the first guide portion is a guide block arranged on one side of the locking member, and the second guide portion is a guide slot arranged on the mounting base, a blocking wall is provided between the guide slot, the insertion cavity, and the accommodation cavity, the blocking wall is configured to block the guide block and provided with a connection port connecting the guide slot, the insertion cavity, and the accommodation cavity.

\* \* \* \* \*